(12) United States Patent
Bokish et al.

(10) Patent No.: US 7,688,852 B2
(45) Date of Patent: Mar. 30, 2010

(54) AUTO-COMPRESSION FOR MEDIA OVER IP

(75) Inventors: Bruce Bokish, Raleigh, NC (US);
Donald Spillane, Cary, NC (US);
Michael Presnell, Durham, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1185 days.

(21) Appl. No.: 10/403,582

(22) Filed: Mar. 31, 2003

(65) Prior Publication Data

US 2004/0190488 A1    Sep. 30, 2004

(51) Int. Cl.
*H04J 3/24*    (2006.01)

(52) U.S. Cl. .................. 370/468; 370/352; 370/477; 375/260

(58) Field of Classification Search .............. None
See application file for complete search history.

(56) References Cited

U.S. PATENT DOCUMENTS

| | | | |
|---|---|---|---|
| 6,665,002 B2 * | 12/2003 | Liu ................ | 348/14.12 |
| 6,665,293 B2 * | 12/2003 | Thornton et al. ...... | 370/352 |
| 6,754,221 B1 * | 6/2004 | Whitcher et al. ...... | 370/401 |
| 6,757,277 B1 * | 6/2004 | Shaffer et al. ........ | 370/356 |
| 6,977,911 B1 * | 12/2005 | Geen et al. ........... | 370/328 |
| 6,996,626 B1 * | 2/2006 | Smith ................. | 709/232 |
| 7,002,992 B1 * | 2/2006 | Shaffer et al. ........ | 370/468 |
| 7,020,263 B2 * | 3/2006 | Bauer et al. ......... | 379/219 |
| 7,023,839 B1 * | 4/2006 | Shaffer et al. ....... | 370/356 |
| 7,068,601 B2 * | 6/2006 | Abdelilah et al. ..... | 370/231 |
| 7,099,274 B2 * | 8/2006 | Park .................. | 370/230 |
| 2003/0012138 A1 | 1/2003 | Abdelilah et al. ..... | 370/231 |
| 2004/0032860 A1 * | 2/2004 | Mundra et al. ........ | 370/352 |
| 2004/0213257 A1 * | 10/2004 | Abdelilah et al. ..... | 370/395.1 |

FOREIGN PATENT DOCUMENTS

| | | |
|---|---|---|
| EP | 1024637 A1 | 8/2000 |
| EP | 1024638 A1 | 8/2002 |
| JP | 11298528 A | 10/1999 |
| JP | 2002204278 A | 7/2002 |
| JP | 2002217972 A | 8/2002 |
| WO | WO 02067543 A2 | 8/2002 |

OTHER PUBLICATIONS

European Search Report for 04394014.7-1244-, mailed Jul. 21, 2004.
Holzl, Gunther and Laszlo Boszormenyi, "Distributed Federative QoS Resource Management," Future Generation Computer Systems 16 (2000), p. 717-725.

* cited by examiner

*Primary Examiner*—Bob A Phunkulh
(74) *Attorney, Agent, or Firm*—Withrow & Terranova, P.L.L.C.

(57) ABSTRACT

The present invention allows communicating devices to control the amount of compression used in packet sessions for transmitting streaming media to and from each other. When a communicating device detects a decrease in performance or quality of service indicative of a limited bandwidth condition, the amount of compression for the current or subsequent sessions is temporarily increased to allow the currently available bandwidth to support the session or subsequent sessions. After a set period of time, or when the limited bandwidth condition is removed, communications associated with the sessions can revert back to transporting uncompressed data or reducing the amount of compression for the sessions, thus using more of the available bandwidth.

23 Claims, 4 Drawing Sheets

AUTO-COMPRESSION FOR MEDIA OVER IP

FIELD OF THE INVENTION

The present invention relates to packet-based communications, and in particular to automatically selecting compression algorithms based on bandwidth availability.

BACKGROUND OF THE INVENTION

With traditional time division multiplexing (TDM) telephone calls, each call is assigned a dedicated circuit having a defined amount of bandwidth. In an operator services environment handling TDM-based telephony calls, each workstation will have fixed TDM connections to carry voice between the operator services telephony switch and the operator position. When the fixed TDM connections, such as T1, T3, and OC-3 connections, are lost, the operator positions physically connected to those failed connections cease to function. All other operator positions connected to functioning connections remain unaffected by the failures of the other connections. When the failed connections are restored, the non-functioning operator positions regain their functionality.

Given the ever-increasing reliability of packet-switched networks, the TDM connections between the operator services switch and the operator positions are incorporating voice-over-packet communications. In such an environment, the actual physical connections are shared between all of the operator positions instead of being individually connected and dedicated to single operator positions. With voice-over-packet, if some but not all of the underlying physical connections are lost, the total bandwidth available to be shared by all of the associated operator positions is reduced, but the ability for the operator positions to communicate with the corresponding operator services switch remains via the physical connections that remain functional. When the bandwidth between the operator positions and the operator services switch is reduced, performance of the system will drop due to increase in packet loss, latency, and jitter. Thus, instead of certain operator positions simply becoming inoperable as in a TDM environment, the quality of service for all of the operator positions in a voice-over-packet system will degrade when physical connections are lost. When the quality of service drops, voice quality is reduced, calls can be dropped, and the operator positions may be dropped from service as a result.

In addition to operator services environments, many organizations, such as colleges and corporations, either currently or in the future will support telephony and streaming media services for multiple users on a campus over a limited-bandwidth connection in a packet-based environment. When some but not all of the underlying physical connections fail, overall bandwidth is reduced and overall system performance for any particular individual may be reduced to the point where voice or media sessions degrade to unacceptable levels or cannot be maintained at all given the multiple attempts from the various users to use the limited bandwidth. Further, increases in demand exceeding allocated or available bandwidth result in diminished system performance. As such, there is a need for a way to decrease the amount of bandwidth required by each user for their telephony or streaming media services when bandwidth is temporarily limited or otherwise insufficient for demand. There is a further need for users to return to using their normal amount of bandwidth once the physical connections are restored and full system bandwidth is available.

SUMMARY OF THE INVENTION

The present invention allows communicating devices to control the amount of compression used in packet sessions for transmitting streaming media to and from each other. When a communicating device detects a decrease in performance or quality of service indicative of a limited bandwidth condition, the amount of compression for the current or subsequent sessions is temporarily increased to allow the currently available bandwidth to support the session or subsequent sessions. After a set period of time, or when the limited bandwidth condition is removed, communications associated with the sessions can revert back to transporting uncompressed data or reducing the amount of compression for the sessions, thus using more of the available bandwidth.

The present invention is particularly beneficial when multiple devices share a limited-bandwidth connection to a remote device, wherein the physical connection is made up of multiple physical connections, which may individually fail, and thus further limit the bandwidth associated with the connection. By allowing each of the communicating devices to automatically detect decreases in bandwidth associated with the physical connection, the communication devices can individually, yet collectively, take measures to reduce the amount of bandwidth they require to facilitate their respective sessions with the remote device. Further, excessive increase in system demand can lead to a limited bandwidth condition. In such cases, the communication devices can increase compression on an individual basis until performance reaches an acceptable level. As such, overloading the connection to the remote device may be avoided.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
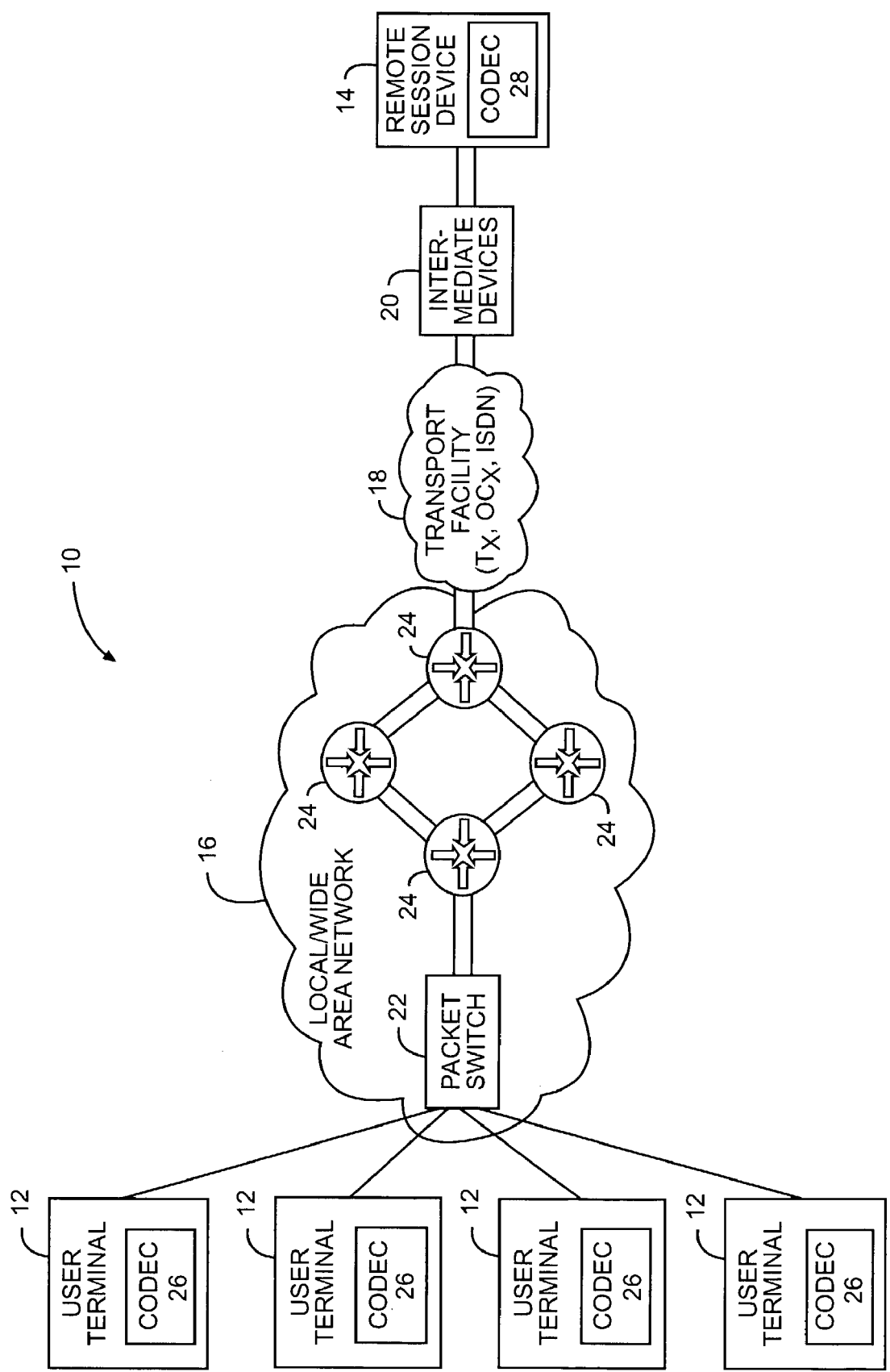
FIG. 1 illustrates a communication environment according to one embodiment of the present invention.

An exemplary communication environment 10 is illustrated in FIG. 1 wherein multiple user terminals 12 are capable of establishing individual sessions for transmitting streaming media, such as voice, video, and audio, to a remote session device 14, which may be an overall endpoint for communications or a means for further distributing the sessions to an appropriate endpoint over one or more contiguous networks. The user terminals 12 are physically connected to the remote session device 14 through a limited-bandwidth network, which may include a local or wide area network 16, a transport facility 18, and any number of intermediate devices 20. The local or wide area network 16 may connect to the user terminals 12 through a traditional packet switch 22, which is further coupled to one or more routers 24. The routers 24 effectively couple the packet switch 22 to the transport facility 18. The transport facility 18 represents clusters of copper or optical cabling that connect one of the routers 24 at the edge of the local or wide area network 16 to the remote session device 14 directly or through any intermediate devices 20, which may be further packet switches 22, routers 24, and the like. Accordingly, the transport facility 18 may be include $T_x$ lines, $OC_x$ connections, integrated services digital network (ISDN) connections, and the like. Notably, these clusters are made of separate cabling, which may individually fail while other cabling remains functional. As such, the bandwidth associated with the transport facility 18 is generally configured to support the requirements of all the user terminals 12, but when one part of the transport facility 18 fails, the amount of bandwidth is reduced and may then be less than that needed for the number of user terminals 12.

In addition to the bandwidth associated with the transport facility 18 changing due to failures of underlying physical connections, other aspects of the connection between the user terminal 12 and the remote session device 14 may influence available bandwidth. For example, the routers 24 and packet switch 22 have limited capacities within the local or wide area network 16. If select routers 24 fail or there is congestion from other traffic that is unanticipated during bandwidth engineering or allocation, diminished bandwidth may result and affect the quality of service associated with sessions between the remote session device 14 and the user terminals 12, collectively or individually. Further, the intermediate devices 20, if present, may also bear on bandwidth available between the remote session device 14 and the user terminal 12.

As noted, the remote session device 14 may be an endpoint or a liaison to other networks and endpoints. With respect to the present invention, sessions that represent all or a portion of a data path are established between the user terminal 12 and the remote session device 14. The media transmitted between the user terminals 12 and their remote session device 14 may be voice, video, or audio, which is streamed between the user terminal 12 and the remote session device 14 and is sensitive to packet loss, latency, or jitter. The media may also be subject to various levels of compression, wherein higher compression levels reduce the amount of data to be transmitted, and thus reduce the bandwidth required for the respective session. Notably, the absence of compression is herein defined as less compressed or a lower compression state, with respect to a compressed state. The user terminals 12 and the remote session device 14 will include coders/decoders (CODECs) 26, 28, which may provide one or more levels of data compression and decompression to facilitate the transport of compressed data as necessary therebetween.

The user terminals 12, and optionally the remote session device 14, are configured to increase compression associated with media transmitted during a current or subsequent session upon determining directly or indirectly that system performance or quality of service is degrading, which indicates that the available bandwidth between the user terminal 12 and the remote session device 14 has been reduced or is otherwise insufficient due to failure or increased overall demand. The following discussion focuses on a failure resulting in reduced bandwidth, but the concepts of the present invention apply to any case in which bandwidth is insufficient. If media is being transmitted between the user terminal 12 and the remote session device 14 in an uncompressed state when there is no limitation on the available bandwidth between the user terminal 12 and the remote session device 14, a reduction in such bandwidth or overall increase in demand may result in the initiation of compression and decompression by the respective CODECs 26, 28. Similarly, if a select level of compression is normally used for media transported between the user terminal 12 and the remote session device 14, a decrease in bandwidth or high demand situation between the two will result in a higher level of compression associated with the media transmitted between the user terminals 12 and the remote session device 14. In the preferred embodiment, each user terminal 12 can detect a reduction in available bandwidth or excessive demand situation between the user terminal 12 and the remote session device 14 and negotiate with the other endpoint to establish a different compression level. As such, the user terminals 12 will act in concert as necessary to reduce the bandwidth they use for associated sessions, and adapt to the available bandwidth provided between the user terminal 12 and the remote session device 14.

Figure 2:
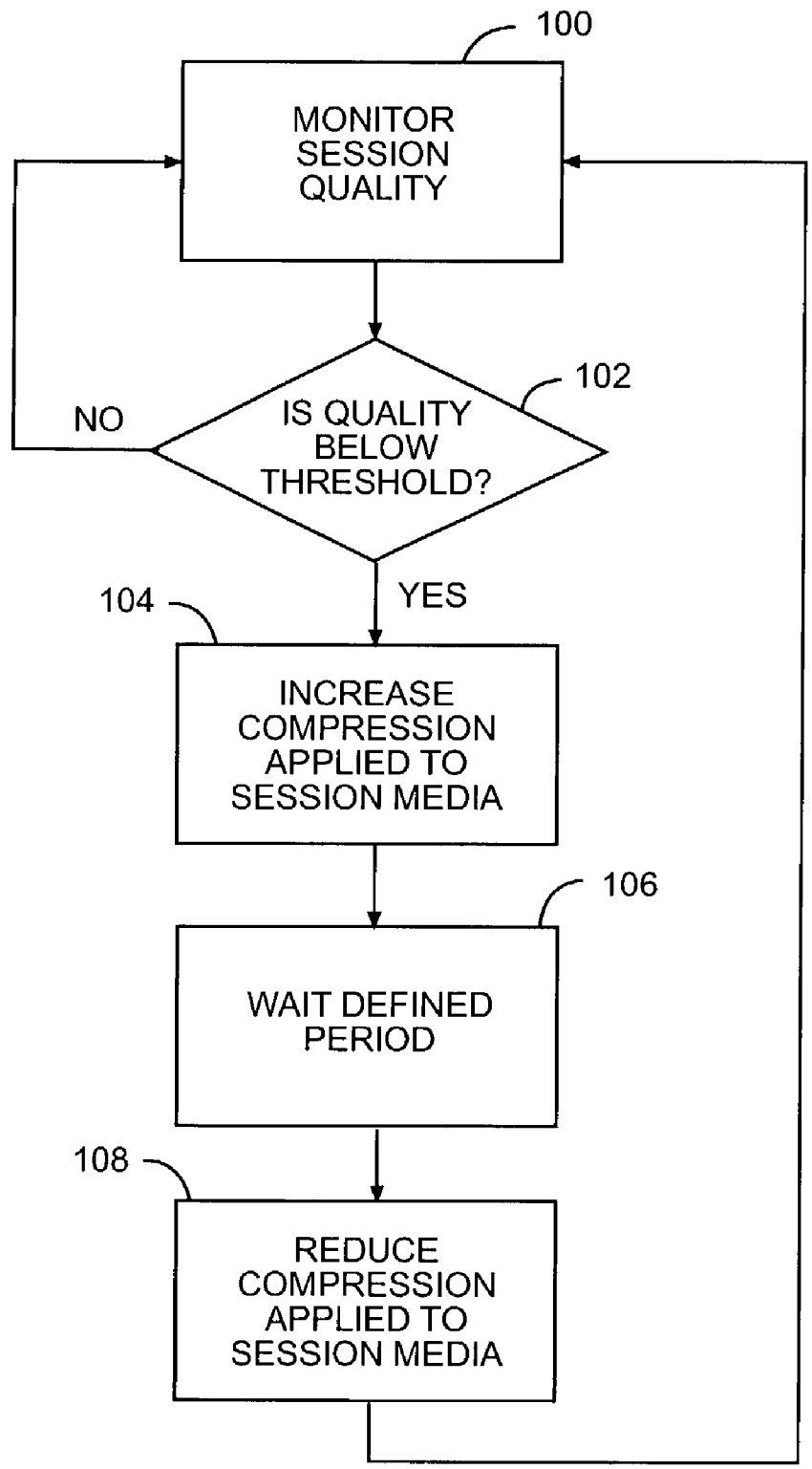
FIG. 2 is a flow diagram outlining the basic operation of one embodiment of the present invention.

Turning now to FIG. 2, a flow diagram outlines the basic operation of the present invention according to one embodiment. Initially, each of the user terminals 12, and optionally the remote session device 14, will monitor session quality by tracking virtually any indicia that is indicative of a decrease in available bandwidth between the user terminals 12 and the remote session device 14. For example, the user terminals 12 and the remote session device 14 may monitor for excessive packet loss, latency, or jitter associated with the session (step 100). If the monitored session quality falls below a defined threshold, such as when packet loss increases above a defined amount, latency increases over a defined threshold, or jitter increases to an unacceptable level, (step 102), the user terminal 12 and optionally the remote session device 14 will take the necessary steps to increase the compression applied to the session media streams (step 104).

For the purposes of the description and the following claims, an increase in compression is defined as increasing compression from one level of compression to another or applying compression where no compression is normally provided. The increased compression may be provided in the current session or in subsequent sessions as desired. The user terminal 12 or the remote session device 14, as the case may be, may wait a defined period of time (step 106) prior to reducing the compression applied to the session media (step 108). In a telephony implementation, network failures must be repaired in a defined amount of time, and as such the defined period for reverting back to a reduced compression level or to a no compression state may be based on a statistical average of network repair. Once compression is reduced or otherwise reverted to a normal state, the session quality will continue to be monitored, and as such, an increase in compression may be applied as the quality of the session remains decreased, which indicates repairs have yet to be made. Otherwise, the user terminals 12 and the remote session device 14 will operate in a normal state until the session quality deteriorates due to bandwidth limitations.

In addition to specifically monitoring session quality, the user terminals 12 or the remote session device 14 may actually receive messages from any of the devices in the local or wide area network 16, an intermediate device 20, or other communication device indicating that bandwidth between the user terminal 12 and the remote session device 14 has been limited. Thus, upon receiving a message indicating that bandwidth is limited, the user terminal 12 or the remote session device 14 may take the necessary steps to increase compression rates in an effort to adapt to the limited bandwidth condition.

Figure 3:
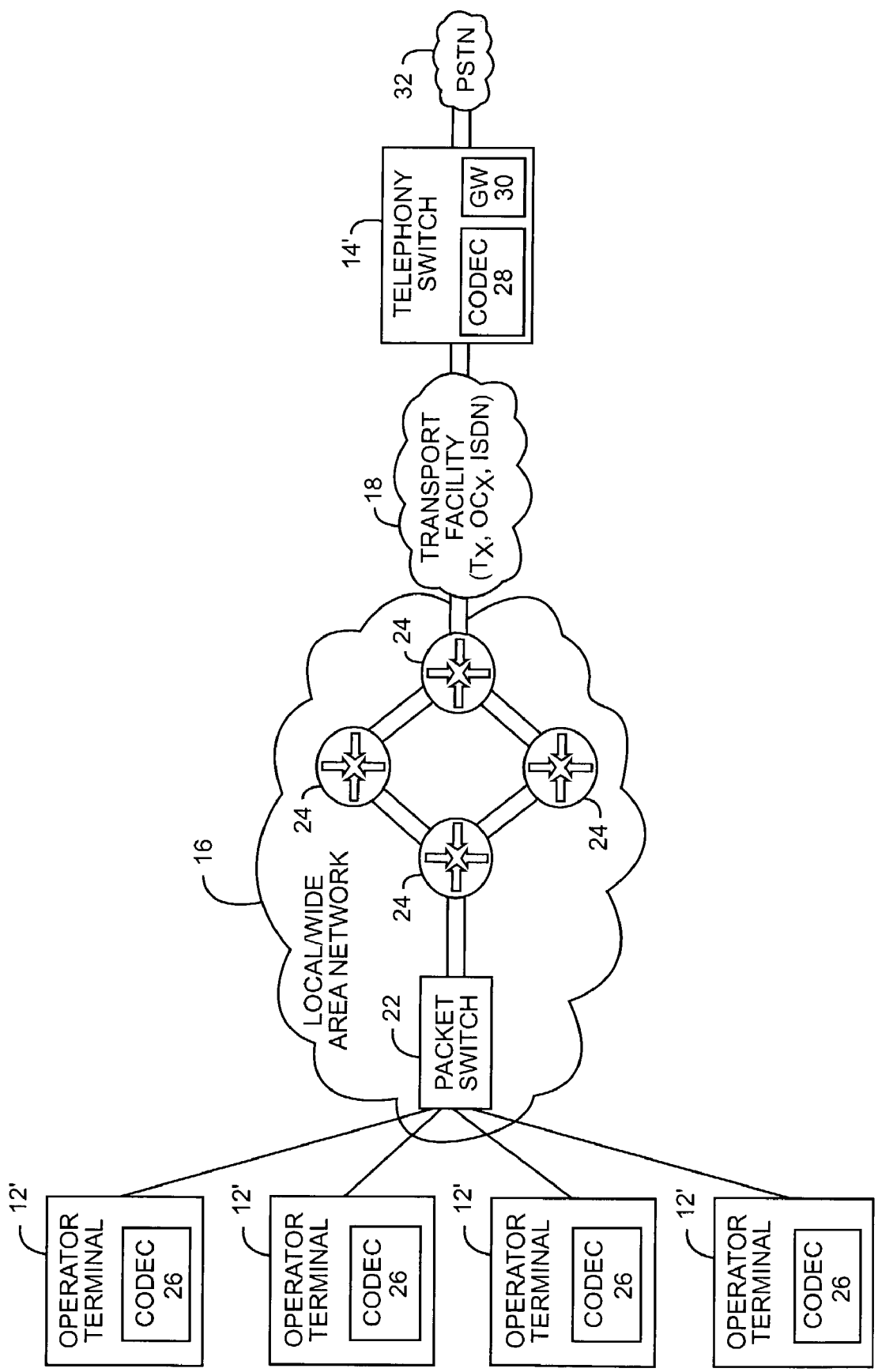
FIG. 3 illustrates an operator services environment according to one embodiment of the present invention.

Turning now to FIG. 3, an operator services environment is illustrated wherein the user terminals 12 are actually operator terminals 12', which are grouped together and are serviced by an operator services or like call center system. In one embodiment, the operator services system is centered about a telephony switch 14', which acts as a remote session device 14. The telephony switch 14' will include or be associated with a gateway (GW) 30 and corresponding CODEC 28, wherein a session between the operator terminal 12' and the telephony switch 14' will be encoded and decoded using complementary CODECs 26 and 28 as described above. In this embodiment, the telephony switch 14' in conjunction with the gateway 30 will provide packet-based communications between the operator terminal 12' and the telephony switch 14' and circuit-switched communications through the public switched telephone network (PSTN) 32 between a caller requesting the services of an operator and the operator terminal 12'. Accordingly, the telephony switch 14' may be an operator services telephony switch that supports the multiple operator terminals 12'.

As such, an operator services call will come in via the PSTN 32 to the telephony switch 14', which will cooperate with the operator terminal 12' to establish a session in which packet-based communications are provided via the local or wide area network 16 and the transport facility 18. Notably, the local or wide area network 16 and the associated transport facility 18 provide a limited bandwidth between the operator terminal 12' and the telephony switch 14'. The operator terminal 12', and optionally the telephony switch 14', is capable of detecting a decrease in quality of service levels associated with reduced bandwidth by monitoring packet loss, latency, jitter, or the like, or alternatively receiving a message indicative of the same, and responding to reductions in available bandwidth by incorporating compression or increasing the amount of compression associated with media transport. Since operator services is predominantly a voice-based service, voice information is transmitted in packet form using voice coding and decoding algorithms. Since the highest voice quality is associated with uncompressed voice, the CODECs 26, 28 will operate under G.711 standards to transport uncompressed voice between the operator terminal 12' and the telephony switch 14' when full bandwidth between the two is available. The G.711 standard generally provides 64 kilobit-per-second, uncompressed voice.

Upon detecting that the bandwidth between the operator terminal 12' and the telephony switch 14' has decreased below a defined level, either the operator terminal 12' or the telephony switch 14' can switch to or initiate new sessions using a higher level of compression, such as that provided under the G.723 standards. Since each operator terminal 12' will either receive messages indicative of decreased levels of bandwidth or detect lower quality of service levels indicative of a decrease in bandwidth, the operator terminals 12', and optionally the telephony switch 14', will cooperate as necessary to adaptively adjust to the available amount of bandwidth between the operator terminals 12' and the telephony switch 14' to prevent overall system inoperability, even though the higher levels of compression may reduce the actual quality of the video, voice, or media streams. Depending on the severity of the reduced bandwidth state, not all of the operator terminals 12' need to switch to G.723 compression. For example, once a certain number of operator terminals 12' switch to G.723 compression, there may be sufficient bandwidth for the remaining operator terminals 12' to continue normal operation using G.711 standards. As noted above, a return from the G.723 to the G.711 compression standard may occur after a period of time, or upon receiving a message indicative of a higher level or full level of bandwidth being available. Importantly, reducing the bandwidth associated with each of the media streams during reduced bandwidth conditions allows each of the operator terminals 12' to function in a sufficient manner and limit their impact on each other.

The packet sessions between the user terminals 12 and the remote session device 14 will be established using some form of session protocol, such as the Session Initiation Protocol (SIP). These session protocols are capable of establishing sessions and identifying the appropriate compression scheme such that the media transported in the session can be encoded and decoded as desired. Further, compression may change during a session or in subsequent sessions upon detecting reduced bandwidth conditions. Even though the above description focuses on providing a standard compression or uncompressed state for a full bandwidth condition and an increased compression state for a reduced bandwidth condition, multiple compression levels may be defined for varying levels of bandwidth reduction. Accordingly, different degrees of reduced bandwidth will correspond to different amounts of compression. Preferably, the levels of compression are engineered to ensure overall operability of the user terminals 12. Those skilled in the art will recognize the applicability of the present invention to not only operator services but for any type of network, such as that provided for university and corporate campuses, which provide packet-based media streaming for voice, audio, and video through a limited-bandwidth transport facility 18, or other bandwidth-limiting architecture.

Figure 4:
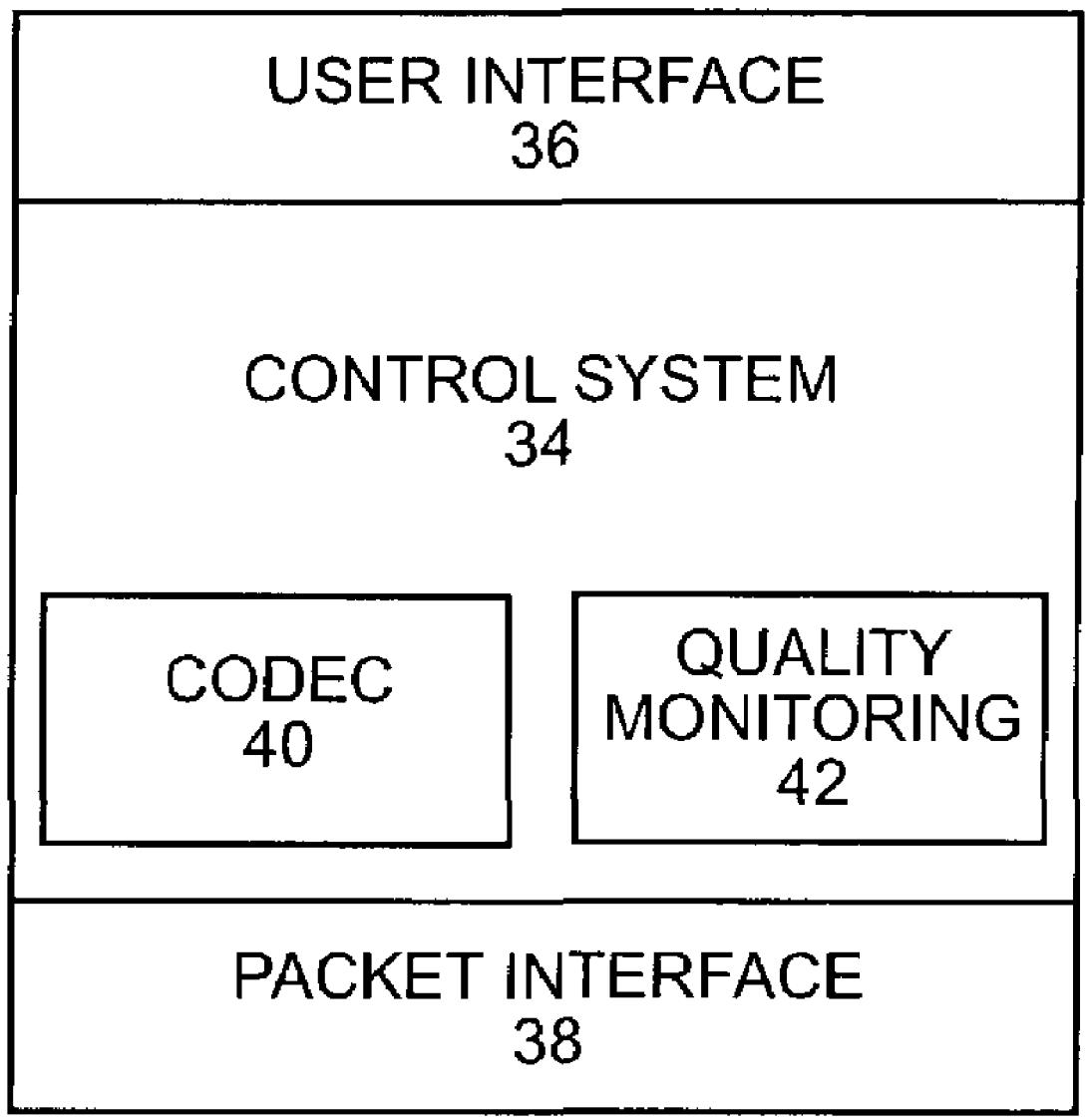
FIG. 4 is a block representation of a user terminal according to one embodiment of the present invention.

With reference to FIG. 4, a block diagram of a basic architecture of a communication device, such as a user terminal 12 or a remote session device 14, is provided. The communication device will include a control system 34 associated with an optional user interface 36 and a packet interface 38, with which sessions are established. The control system 34 will implement a CODEC 40, such as CODECs 26 and 28, and a quality monitoring function 42. The quality monitoring function 42 may be able to monitor information bearing on the available bandwidth for communication sessions. The control system 34 will use the quality monitoring function 42 to determine when to increase compression for session media. If the control system 34 is adapted to receive messages from other devices indicative of reduced bandwidth states, the quality monitoring function 42 may be used to supplement the invention, or may not be necessary.

Those skilled in the art will recognize improvements and modifications to the preferred embodiments of the present invention. All such improvements and modifications are considered within the scope of the concepts disclosed herein and the claims that follow.

What is claimed is:

1. A communication device comprising:

a) a communication interface; and b) a control system associated with the communication interface and adapted to:
  i) communicate with a remote session device via a first session;
  ii) monitor session quality in order to detect a reduced bandwidth condition during the first session between the communication device and the remote session device by monitoring:
    a) packet loss associated with the communications with the remote session device and detecting the reduced bandwidth condition when the packet loss exceeds the defined threshold; and
    b) packet latency associated with the communications with the remote session device and detecting the reduced bandwidth condition when the packet latency exceeds the defined threshold; and
    c) jitter associated with the communications with the remote session device and detecting the reduced bandwidth condition when the jitter exceeds the defined threshold;
  iii) communicate with the remote session device during the first session using an increased rate of compression upon detecting the reduced bandwidth condition in the first session; and
  iv) revert back to communicating with the remote session device during the first session in a normal fashion without the increased rate of compression after a defined period of time.

2. The communication device of claim 1 wherein the communications during the fast session are uncompressed and communications during subsequent sessions are compressed using a fast rate of compression.

3. The communication device of claim 2 wherein the communications during the first session are uncompressed voice communicated according to G.711 standards.

4. The communication device of claim 3 wherein the communications during the subsequent sessions are compressed voice communicated according to G.723 standards.

5. The communication device of claim 1 wherein the communications during the first session are compressed at a lower rate of compression and communications during subsequent sessions are compressed at a higher rate of compression.

6. The communication device of claim 1 further comprising using the increased rate of compression for the first session upon detecting the reduced bandwidth condition.

7. The communication device of claim 1 wherein the communication device is an operator services terminal.

8. The communication device of claim 1 wherein the control system reverts back to communicating with the remote session device in the normal fashion without the increased rate of compression upon receiving a message indicative of an end to the reduced bandwidth condition.

9. A system comprising a plurality of user terminals adapted to communicate with a remote session device over a limited bandwidth, each user terminal adapted to:
  a) communicate with the remote session device via a first session;
  b) monitor session quality in order to detect a reduced bandwidth condition during the first session between the communication device and the remote session device by monitoring:
    a) packet loss associated with the communications with the remote session device and detecting the reduced bandwidth condition when the packet loss exceeds the defined threshold; and
    b) packet latency associated with the communications with the remote session device and detecting the reduced bandwidth condition when the packet latency exceeds the defined threshold; and
    c) jitter associated with the communications with the remote session device and detecting the reduced bandwidth condition when the jitter exceeds the defined threshold;
  c) communicate with the remote session device during the first session using an increased rate of compression upon detecting the reduced bandwidth condition; and
  d) revert back to communicating with the remote session device during the first session in a normal fashion without the increased rate of compression after a defined period of time.

10. The system of claim 9 wherein for each user terminal, the communications during the first session are uncompressed and communications during subsequent sessions are compressed at a higher rate of compression.

11. The system of claim 10 wherein for each user terminal, the communications during the first session are uncompressed voice communicated according to G.711 standards.

12. The system of claim 11 wherein for each user terminal, the communications during the subsequent sessions are compressed voice communicated according to G.723 standards.

13. The system of claim 9 wherein for each user terminal, the communications during the first session are compressed at a lower rate of compression and communications during subsequent sessions are compressed at a higher rate of compression.

14. The system of claim 9 wherein each user terminal is further adapted to use the increased rate of compression for the first session upon detecting the reduced bandwidth condition.

15. The system of claim 9 wherein the plurality of user terminals are operator services terminals in an operator services system.

16. The system of claim 9 wherein each user terminal is further adapted to revert back to communicating with the remote session device in the normal fashion without the increased rate of compression upon receiving a message indicative of an end to the reduced bandwidth condition.

17. A method comprising:
  a) communicating with a remote session device via a first session;
  b) b) monitor session quality in order to detect a reduced bandwidth condition during the first session between the communication device and the remote session device by monitoring:
    a) packet loss associated with the communications with the remote session device and detecting the reduced bandwidth condition when the packet loss exceeds the defined threshold; and
    b) packet latency associated with the communications with the remote session device and detecting the reduced bandwidth condition when the packet latency exceeds the defined threshold; and
    c) jitter associated with the communications with the remote session device and detecting the reduced bandwidth condition when the jitter exceeds the defined threshold;
  c) communicating with the remote session device during the first session using an increased rate of compression upon detecting the reduced bandwidth condition; and
  d) reverting back to communicating with the remote session device during the first session in a normal fashion without the increased rate of compression after a defined period of time.

18. The method of claim 17 wherein the communications during the first session are uncompressed and communications during subsequent sessions are compressed using a first rate of compression.

19. The method of claim 18 wherein the communications during the first session are uncompressed voice communicated according to G.711 standards.

20. The method of claim 19 wherein the communications during the subsequent sessions are compressed voice communicated according to G.723 standards.

21. The method of claim 17 wherein the communications during the first session are compressed at a lower rate of compression and communications during subsequent sessions are compressed at a higher rate of compression.

22. The method of claim 17 further comprising using the increased rate of compression for the first session upon detecting the reduced bandwidth condition.

23. The method of claim 17 further comprising reverting back to communicating with the remote session device in the normal fashion without the increased rate of compression upon receiving a message indicative of an end to the reduced bandwidth condition.

* * * * *